United States Patent [19]
Lewiner et al.

[11] Patent Number: 5,926,768
[45] Date of Patent: Jul. 20, 1999

[54] METHOD OF OPTIMIZING RADIO COMMUNICATION BETWEEN A BASE AND A MOBILE

[76] Inventors: Jacques Lewiner, 7, avenue de Suresnes, 92210 Saint Cloud; Eric Carreel, 9, rue du Général Gouraud; Mathias Fink, 16, rue Edouard Laferrière, both of 92190 Meudon, all of France

[21] Appl. No.: 08/842,060

[22] Filed: Apr. 23, 1997

[30] Foreign Application Priority Data

Apr. 24, 1996 [FR] France ................................... 96 05173

[51] Int. Cl.⁶ .................. H04Q 7/32; H04Q 7/36
[52] U.S. Cl. .................. 455/562; 455/67.6; 455/456; 455/63; 455/506
[58] Field of Search ................ 455/562, 67.6, 455/456, 423, 424, 67.3, 504, 505, 506, 63, 65, 67.1, 272, 278.1, 296

[56] References Cited

U.S. PATENT DOCUMENTS

| | | | |
|---|---|---|---|
| 5,566,168 | 10/1996 | Dent | 370/50 |
| 5,600,706 | 2/1997 | Dunn et al. | 379/59 |
| 5,670,964 | 9/1997 | Dent | 342/457 |
| 5,758,288 | 5/1998 | Dunn et al. | 455/456 |
| 5,828,658 | 10/1998 | Ottersten et al. | 370/310 |

FOREIGN PATENT DOCUMENTS

| | | |
|---|---|---|
| 0 096 943 A2 | 12/1983 | European Pat. Off. |
| 0 593 186 A1 | 4/1994 | European Pat. Off. |
| 2 225 199 | 5/1990 | United Kingdom. |
| WO 95/22873 | 8/1995 | WIPO. |

*Primary Examiner*—Dwayne D. Bost
*Assistant Examiner*—Alan Gantt
*Attorney, Agent, or Firm*—Marshall, O'Toole, Gerstein, Murray & Borun

[57] ABSTRACT

A method of optimizing radio communication between a fixed base station having a plurality of antennas and a mobile station by applying, in the base station, processing to all signals $S_i(t)$ received or transmitted via each of the antennas so as to determine corresponding corrected signals $S_i(t) = h_i(-t) \otimes S_i(t)$, where $h_i(-t)$ is an approximation to the time reversal of the impulse response $h_i(t)$ between antenna and the mobile station.

12 Claims, 2 Drawing Sheets

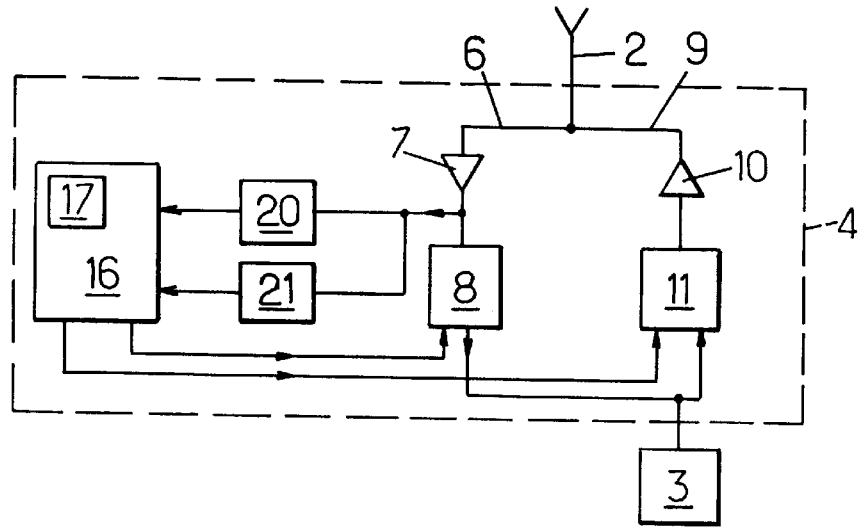
FIG.4.
FIG.5.
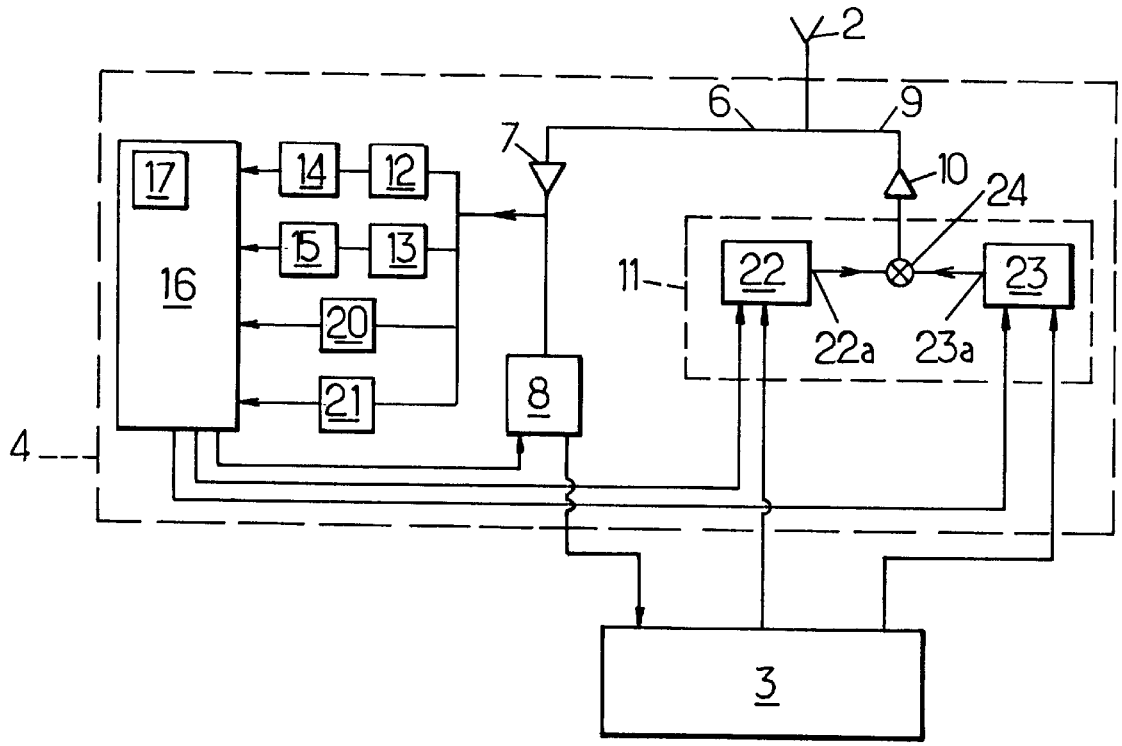

METHOD OF OPTIMIZING RADIO COMMUNICATION BETWEEN A BASE AND A MOBILE

The present invention relates to methods of optimizing communication between a fixed base station (a "base") and a mobile station (a "mobile").

BACKGROUND OF THE INVENTION

Radio communication between a transmitter and a receiver, one of which is mobile, is made difficult by the fact that radio waves going from the transmitter to the receiver travel simultaneously along a multitude of paths of different lengths, and are subject to numerous reflections, and by the fact that these various paths themselves vary over time as a function of movements of the mobile or as a function of changes to the immediate environment of the mobile (in particular: vehicles travelling close to the mobile).

As a result, the signal picked up on arrival is constituted by the superposition of a multitude of signals that are phase-shifted relative to one another and that correspond respectively to the different paths along which the radio wave has travelled between the transmitter and the receiver, such that: firstly the signal as picked up is difficult to decode; and secondly interference phenomena occur which, in certain particular positions of the receiver antenna, can cause the signal as picked up to cancel out completely.

In an attempt to remedy those drawbacks, several palliatives are known:

- transmitter power can be increased at the mobile and at the base, however, that disposition is not very effective since it also increases the level of noise due to the multiple reflections of the radio signal, and in addition it is difficult to apply at the mobile end where any increase in transmitter power gives rise to an increase in weight and bulk and to a decrease in battery life;
- it is also possible to multiply the number of bases so that radio communication is always taking place over a short distance between each mobile and one of the bases, however that solution is expensive; and
- it is also known to make use at the base of a multitude of synchronized antennas organized in an array, thereby making it possible to reduce problems due to destructive interference, but that does not improve the signal-to-noise ratio of the signal as picked up and it does not take account of variations in the electro-magnetic environment.

OBJECTS AND SUMMARY OF THE INVENTION

A particular object of the present invention is to propose a novel technical solution which is more satisfactory than the above-mentioned solutions.

To this end, the invention provides a method of optimizing radio communication between a fixed base transmitter/receiver station provided with a plurality of synchronized antennas organized in an array, and at least one mobile transmitter/receiver station, the method consisting, for each antenna i in the base, processing an electric signal $S_i(t)$ which is a receive signal received by said antenna from the mobile under consideration or which is a transmit signal for transmission by said antenna to said mobile, by determining a corrected electric signal $$S'_i(t) = h'_i(-t) \otimes S_i(t)$$

where:
- $\otimes$ designates the convolution product;
- t designates time; and
- $h'_i(-t)$ is an approximation to the time reversal of the impulse response $h_i(t)$ between the antenna i and the mobile, said impulse response being such that when a radio signal $E(t)$ is transmitted by one of the antenna and the mobile, the other of said two elements receives a signal $R(t) = h_i(t) \otimes E(t)$;
- the corrected signal $S'_i(t)$ then being either transmitted to the mobile by the antenna in question if the signal $S_i(t)$ is a transmit signal, or else being combined with the other signals as received by the other antennas of the base, if the signal $S_i(t)$ is a receive signal.

In preferred embodiments, one or more of the following dispositions may optionally be implemented:

the method includes the following steps:
  a) determining for each antenna i an approximation $h'_i(t)$ to the impulse response $h_i(t)$;
  b) time reversing said approximation $h'_i(t)$, thus providing an approximation $h'_i(-t)$ to the time reversed impulse $h_i(-t)$; and
  c) for each antenna i, processing the electric signal $S_i(t)$ so as to determine the corresponding corrected signal $S'_i(t)$;

during step a), the approximation $h'_i(t)$ of the impulse response specific to each antenna is determined on the basis of a predetermined radio signal transmitted by the mobile, said step a) being performed at regular time intervals for each mobile;

steps a) and b) are performed once and for all, for a given geographical area, step a) consisting in transmitting at least one predetermined radio signal successively from a plurality of points k in the area under consideration, thereby determining a series of approximations $h'_{ik}(t)$ of the impulse response $h_{ik}(t)$ between each point k and each antenna i of the base, and then in computing the approximation $h'_i(t)$ using the formula $h'_i(t) = \Sigma_k a_k h'_{ik}(t)$, where the terms $a_k$ designate weighting coefficients, said approximation $h'_i(t)$ subsequently being used in step c) for processing the signals transmitted to or received from any mobile located in the above-mentioned given area;

the base covers a plurality of above-mentioned areas, a series of approximations $h'_i(t)$ to the impulse response being determined once and for all in steps a) and b) for each of the above-mentioned areas, and step c) is implemented successively at least at the beginning of each call between a base and each mobile, respectively with each of the series of approximations $h'_i(t)$ corresponding respectively to the various areas, determining on each occasion a corrected signal $S'_i(t)$ from a signal $S_i(t)$ received from the mobile under consideration, and then determining which series of approximations $h'_i(t)$ corresponding to a given area optimizes the combination of corrected signals $S'_i(t)$, said series of approximations $h'_i(t)$ subsequently being used to correct the signals transmitted to or received from the mobile under consideration;

the radio signals normally transmitted by the base are modulated signals having a carrier frequency f0, the signals normally transmitted by the mobile are modulated signals having a carrier frequency f1 that is different from f0, and the steps a) and b) are performed as follows:

firstly, by causing a first predetermined radio signal to be transmitted by the mobile or from each point k, said signal having frequencies close to f0, thereby enabling an approximation $h'_i(t)_{tx}$ to the impulse response to be determined that is valid for subsequent use in step c) for processing the signals that are to be transmitted by the antenna i; and a secondly by causing a second predetermined radio signal to be transmitted by the mobile or from each point k, said signal having frequencies close to f1, thereby enabling an approximation $h'_i(t)_{rx}$ to the impulse response to be determined which is valid for subsequent use during step c) for processing the signals received by the antenna i;

the radio signals normally transmitted by the base (1) are modulated signals at a carrier frequency f0, the method including the following additional steps:

a'1) causing a monochromatic radio signal E(t,f0) of frequency f0 to be transmitted by the mobile or from each point k;

a'2) using each antenna i to pick up a monochromatic electric signal $R_i$(t,f0) corresponding to the transmitted monochromatic signal E(t,f0); and a'3) using the picked up signal to determine a complex value $H_i(f0)=A_ie^{j\Phi i}$ defined by:

$R_i(t,f0)=H_i(f0) \cdot E(t,f0)$;

step c) of the method further including the following three substeps, for determining the corrected signal $S'_i(t)$ from a transmit signal $S_i(t)=P(t) \cdot e^{js(t)}$, where P(t) is a carrier signal of frequency f0, and s(t) is a modulating signal:

c1) using analog means to determine the product $P'(t)=P(t) \cdot [-H_i(-f0)$, where $H_i(-f0)=A_ie^{-j\Phi i}$;

c2) digitally computing the function $$C_i(t) = \int_{-\infty}^{+\infty} [-H_i(-f0)]^{-1} e^{-j2\pi f0\tau} e^{js(t-\tau)} h'_i(-\tau) d\tau$$

c3) determining the correct signal $S'_i(t)$ by obtaining the product of the complex functions P'(t) and $C_i(t)$;

the signal to be corrected $S_i(t)$ is a modulated signal having a determined carrier frequency f, said signal being modulated over a range of frequencies of width that is less than 1% of the carrier frequency f, the method including the following steps:

d) determining $H_i(f)=A_ie^{j\Phi i}$ which is the complex value of the transfer function between the antenna i and the mobile at frequency f, said transfer function being such that when a monochromatic radio signal E(t,f) of frequency f is transmitted by one of the antenna and the mobile, the other of said two elements received a signal $R(t,f)=H_i(f) \cdot E(t,f)$; and e) determining the corrected signal $S'_i(t)$ in approximate manner from the following complex product:

$S'_i(t)=[-H_i(-f)] \cdot S_i(t)$ where $H_i(-f)=A_ie^{-j\Phi i}$;

the signal to be corrected $S_i(t)$ is a modulated signal having a determined carrier frequency f, said signal being modulated over a range of frequencies of width that is less than 1% of the carrier frequency f, the method including the following steps:

during step d), the value $H_i(f)$ is determined in the base from a monochromatic radio signal of frequency f transmitted by the mobile, said determination being performed at regular time intervals for each mobile;

during step d), the transfer function $H_i(f)$ is determined for a given area once and for all, by causing a monochromatic radio signal of frequency f to be transmitted successively from a plurality of points k in the area under consideration, thereby determining a series of values $H_{ik}(f)$ for the transfer functions $H_{ik}$ between each point k and each antenna i of the base, and then calculating the value $H_i(f)$ in application of the formula:

$H_i(f)=\Sigma_k a_k H_{ik}(f)$ where the terms $a_k$ designate weighting coefficients, said value $H_i(f)$ then being used to process the signals transmitted to or received from any mobile in the above-mentioned given area;

the base covers a plurality of the above-mentioned areas, a series of values $H_i(f)$ for the transfer function being determined in step d) for each of the above-mentioned areas, and in which step e) is implemented at least at the beginning of each call between the base and each mobile, with each series of approximations $H_i(f)$ corresponding to respective different areas, by determining on each occasion a corrected signal $S'_i(t)$ from a signal $S_i(t)$ received from the mobile under consideration, and then determining which series of values $H_i(f)$ corresponding to a given area optimizes the combination of corrected signals $S'_i(t)$, said series of values $H_i(f)$ subsequently being used in step e) to correct the signals transmitted to or the signals received from the mobile under consideration; and the radio signals normally transmitted by the base are modulated signals having a carrier frequency f0, the signals normally transmitted by a mobile being modulated signals having a carrier frequency f1 different from f0, and step d) is performed as follows:

firstly by causing a monochromatic radio signal of frequency f0 to be transmitted by the mobile or from each point k, thereby enabling a value $H_i(f0)$ to be determined for the impulse response, which value is valid subsequently during step e) for processing the signals to be transmitted by the antenna i; and secondly causing a monochromatic radio signal of frequency f1 to be transmitted by the mobile or from each point k in order to determine a value $H_i(f1)$ for the transfer function, which value is valid subsequently during step a) for processing the signals received by the antenna i.

BRIEF DESCRIPTION OF THE DRAWINGS

Other characteristics and advantages of the invention appear from the following detailed description of various embodiments, given as non-limiting examples, and with reference to the accompanying drawings.

In the drawings:

FIGS. 4 and 5 are views similar to FIG. 2, for other embodiments of the invention.

MORE DETAILED DESCRIPTION

Figure 1:
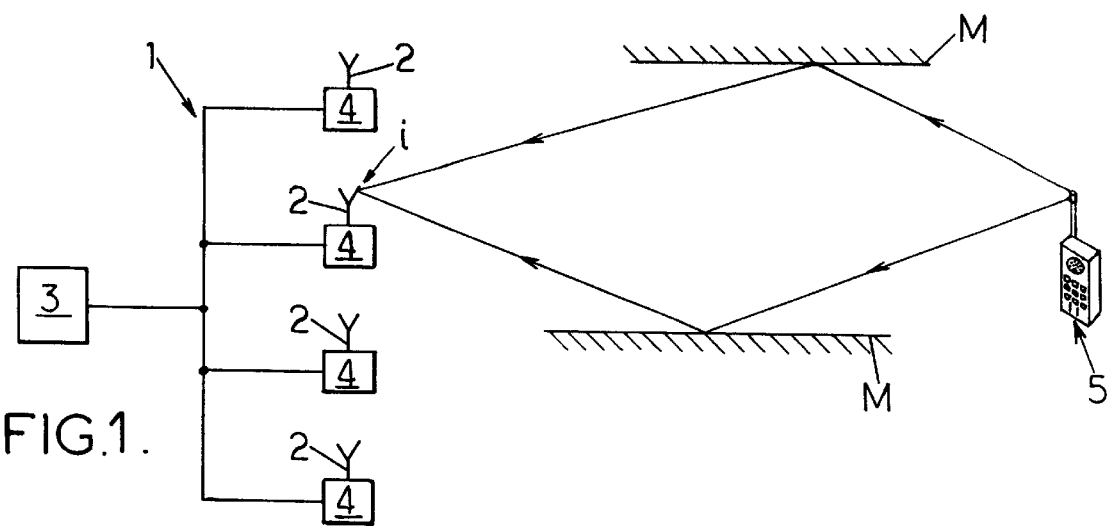
FIG. 1 is a diagram showing the general principle of the invention.

FIG. 1 is a diagram showing a fixed base station 1 (a "base") for radiotelephony or the like which communicates with at least one mobile station 5 (a "mobile") such as a radiotelephone or other radio transmitter/receiver.

The base 1 is provided with a plurality of synchronized antennas 2 that are organized as an array and are connected in parallel via signal processing units 4 to a central system 3 for decoding and processing data.

For each antenna and for each mobile 5 there exists a function of time $h_i(t)$ which is the impulse response corresponding to antenna i and to the mobile 5 under consideration.

This impulse response $h_i(t)$ corresponds to the signal that would be received by the antenna i if the mobile 5 in question were to transmit a radio signal in the form of a Dirac pulse, taking account in particular of the multiple reflections to which the radio waves are subject on various obstacles M between the mobile 5 and the antenna i.

When the mobile 5 transmits a signal $E(t)$ causing a signal $R_i(t)$ to be received by the antenna i, the impulse response also relates the signal $R_i(t)$ to the signal $E(t)$ by the formula:

$$R_i(t) = h_i(t) \otimes E(t)$$
$$= \int_{-\infty}^{+\infty} E(\tau) h_i(t-\tau) d\tau$$

In other words, $R_i(t)$ is the convolution product of $h_i(t)$ and $E(t)$.

Also, the impulse response $h_i(t)$ is valid between the antenna i and the mobile 5 in question in both directions of communication: when the antenna i transmits a signal $E_i(t)$, the signal $R_i(t)$ received by the mobile under consideration is thus $R_i(t)=h_i(t)\otimes E_i(t)$.

According to the invention, when an electric signal $S_i(t)$ is received from the mobile 5 under consideration by antenna i or is to be transmitted from said antenna to said mobile, a corrected electric signal $S'_i(t)$ is devised within the base 1 corresponding to the convolution product of $S_i(t)$ and $h_i(-t)$:

$$S'_i(t)=h'_i(-t)\otimes S_i(t)$$

where $h'_i(-t)$ is an approximation to the time reversal of the impulse response $h_i(t)$ between the antenna i and the mobile under consideration (in the present specification, the symbol ' always specifies a corrected or approximated value, and under no circumstances does it designate a derivative function).

Naturally, the corrected signals $S'_i(t)$ could be multiplied by a complex term $Ae^{j\phi}$ (i.e. multiplied by A and phase shifted by $\phi$, where A and $\phi$ are real numbers representing an amplitude and a phase respectively) that is identical for all of the antennas i, without thereby going beyond the ambit of the invention.

Thereafter, the corrected signal $S'_i(t)$ is:

either transmitted by the antenna i to the mobile 5 if the signal $S_i(t)$ is a transmit signal;

or else combined (added) with other signals received by other antennas of the base, if the signal $S_i(t)$ is a signal received by the antenna i.

This correction to the signal $S_i(t)$ serves to compensate for the deformations which have been imposed by the environment on the signal as initially transmitted by the mobile 5 when $S_i(t)$ is a receive signal, or to compensate the deformations which will be imposed by the environment on the signal transmitted by the antenna i to the mobile 5 when the signal $S_i(t)$ is a transmit signal.

Several embodiments are described below for implementing this correction on the signal $S_i(t)$.

Figure 2:
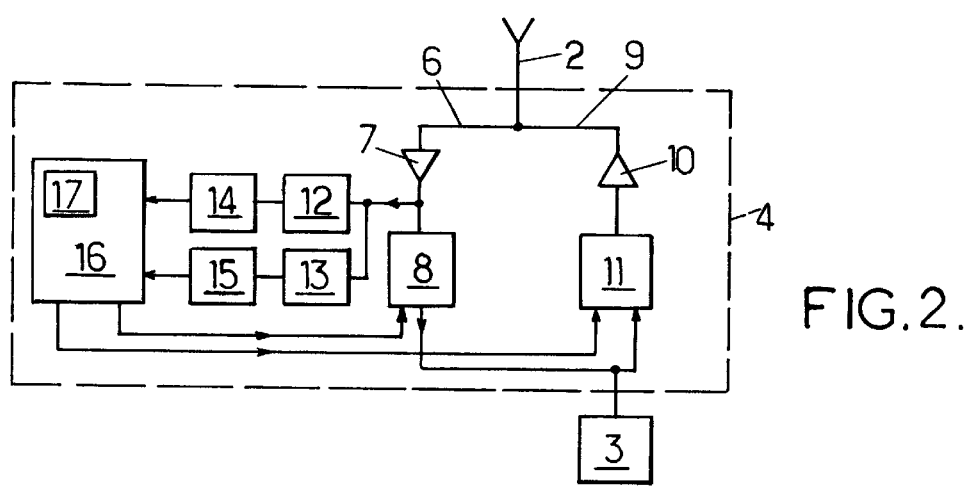
FIG. 2 is a view showing a detail of FIG. 1.

In a first embodiment, as shown in FIG. 2, each signal processing unit 4 comprises:

firstly a receive path 6 having an amplifier 7 and a signal processor 8 which is described below; and secondly a transmit path 9 having an amplifier 10 and a signal processor 11 which is also described below.

Upstream from the signal processor 8, the receive path 6 is connected to two circuits 12 and 13, generally analog circuits, which are adapted to measure respectively the amplitude $A_i$ and the phase $\phi_i$ of a signal picked up by the antenna 2, such circuits being well known in the state of the art.

The circuits 12 and 13 are connected respectively to two analog-to-digital converters 14 and 15 which are themselves connected to a computer 16 having a memory 17, the computer being designed to control the signal processors 8 and 11, as described below.

In a first embodiment, each mobile 5 is caused, from time to time, e.g. once every minute, to transmit a run of monochromatic radio signals which can be written in complex form as follows: $E(t,f)=E_0 e^{j2\pi ft}$ where $E_0$ represent amplitude, t represents time, and f represents frequency, the monochromatic radio signals having successive different frequencies f.

Each of these monochromatic radio signals $E(t,f)$ is picked up by each of the antennas 2 of the base, in the form of a signal that is likewise monochromatic $R_i(t,f)=H_i(f)\cdot E(t,f)$ where $H_i(f)$ is the complex value taken by the transfer function $H_i$ corresponding to the antenna i and to the mobile 5 in question for the frequency f under consideration. In conventional manner, the transfer function $H_i(f)$ can be expressed in the form:

$$H_i(f)=A_i(f)e^{j\phi i(f)}$$

where $A_i(f)$ and $\phi_i(f)$ are respectively the modulus and the argument of the complex number $H_i(f)$.

Also in conventional manner, the base 1 and the mobile 5 are synchronized so as to have a common time-base, such that the signal $E(t,f)$ is accurately known by the base 1.

Thus, during successive transmissions of mono-chromatic radio signals by the mobile 5, the coefficients $A_i(f)$ and $\phi_i(f)$ respectively can be measured by the circuits 12 and 13 of the signal processor units 4, for each antenna 2.

These values are applied to the corresponding computer 16 which stores them in its memory 17, such that at the end of said successive transmissions of mono-chromatic radio signals, the memory 17 contains, for each mobile 5 communicating with the base 1, a series of values for the coefficients $A_i(f)$ and $\phi_i(f)$ which are representative of a series of complex values $H_i(f)=A_i(f)e^{j\phi i(f)}$.

On the basis of this series of values, the computer 16 determines an approximation $h'_i(t)$ to the impulse response $h_i(t)$ corresponding both to the antenna i under consideration and to the mobile 5 under consideration by performing the inverse Fourier transform: in other words, the approximation $h'_i(t)$ is determined by the computer 16 by computing an approximation to the expression:

$$\int_{-\infty}^{+\infty} e^{j2\pi ft} H_i(f) df.$$

In practice, the radio signals that are normally transmitted by the base are modulated signals having a carrier frequency f0, and the signals normally transmitted by the mobile 5 are likewise modulated signals having a carrier frequency f1 which may be different from f0.

In this case, it is generally preferable to use two different approximations of the transfer function $H_i(t)$ for use in the base 1 respectively for processing the transmit signals and the receive signals.

To this end, the above-described operations are performed successively by causing the mobile 5 to transmit firstly a series of monochromatic radio signals at frequencies close to the frequency f0, and secondly a series of monochromatic radio signals having frequencies close to the frequency f1.

The computer 16 thus determines for each mobile 5 firstly an approximation $h'_i(t)_{tx}$ which is valid for signals transmitted by the base to the mobile under consideration, and secondly an approximation $h'_i(t)_{rx}$ which is valid for the signals received by the base from said mobile.

The computer 16 then determines the time reversed functions $h'_i(-t)_{tx}$ and $h'_i(-t)_{rx}$ corresponding respectively to the two above-mentioned approximations of the impulse response, and it stores these functions in its memory 17.

The signal processor 8 is adapted to process a signal $S_i(t)$ coming from the amplifier 7 and to produce a corrected signal equal to the convolution product of the signal $S_i(t)$ and the function $h'_i(-t)_{rx}$ which has been given to it by the computer 16:

$$S'_i(t) = h'_i(-t)_{rx} \otimes S_i(t)$$

the corrected signal $S'_i(t)$ then being forwarded to the central system 3.

Similarly, the signal processor 11 is adapted to process a signal $S_i(t)$ received from the central system 3, and to deliver a corrected signal $S'_i(t)$ by convolution with the function $h'_i(-t)_{tx}$ which has been given to it by the computer 16:

$$S'_i(t) = h'_i(-t)_{tx} \otimes S_i(t)$$

with the corrected signal $S'_i(t)$ then being forwarded to the amplifier 10.

The processors 8 and 11 for performing these convolution products may be computers or portions of computers (in which case they may possibly be integrated in the computer 16), or they may be digital signal processors, or they may be special analog components such as those described in French patent application No. 96 05102 filed on Apr. 23, 1996 and entitled "An analog filter for electric signals".

By means of these dispositions, the electric signals which are received by the central system 3 of the base 1, or by the mobile 5, are much easier to decode than in the prior art.

Figure 3:
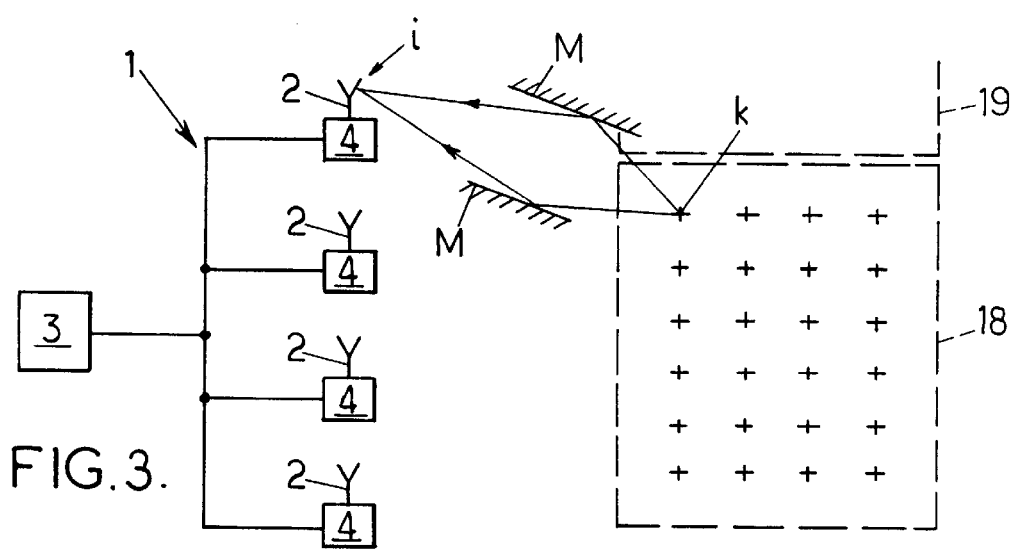
FIG. 3 is a diagram showing a second embodiment of the invention.

In a second embodiment, shown diagrammatically in FIG. 3, the approximations $h'_i(t)_{tx}$ and $h'_i(t)_{rx}$ applicable in a given geographical area 18 are determined once and for all for each of the antennas 2 of the base 1, with the same approximations $h'_i(t)_{tx}$ and $h'_i(t)_{rx}$ being used thereafter for any mobile present in the area 18.

For this purpose, during a preliminary step which is performed when the base 1 is put into operation, or which is performed on various occasions during the lifetime of the base 1, runs of monochromatic radio signals $E_k(t,f)$ having different successive frequencies are caused to be transmitted from various points k in the area 18 under consideration, and then in the manner explained above, the approximation $h'_{ik}(t)_{tx}$ or $h'_{ik}(t)_{rx}$ to the impulse response between the point k under consideration and the antenna 2 of index i is computed, after which the approximations $h'_i(t)_{rx}$ and $h'_i(t)_{tx}$ are computed using the following formulas:

$$h'_i(t)_{rx} = \Sigma_k a_k h'_{ik}(t)_{rx}$$

and $$h'_i(t)_{tx} = \Sigma_k a_k h'_{ik}(t)_{tx}$$

The terms $a_k$ designate weighting coefficients that can be selected in particular to give advantage to certain portions of the geographical area 18 which correspond to a high probability of mobiles being present (sidewalks, stations, commercial centers, etc.), compared with portions of the area 18 which have a lower probability of a mobile being present. Where appropriate, the coefficients $a_k$ can all be equal, and in particular they can all be equal to 1.

The computer 16 stores the functions $h'_i(-t)_{tx}$ and $h'_i(-t)_{rx}$ in its memory 17, and these two functions are given by the computer 16 to the processors 8 and 11 respectively whenever the base 1 is communicating with a mobile situated in the area 18 in question.

In most cases, the base 1 covers a plurality of areas 18, 19, and the above-mentioned operations of determining the functions $h'_i(-t)_{rx}$ and $h'_i(-t)_{tx}$ are performed for each of the areas covered by the base.

These various functions are all stored in the memories 17 of the computers 16 at the beginning of communication between the base and each mobile 5, with the computer 16 corresponding to the antenna 2 of index i applying the various functions $h'_i(-t)_{rx}$ contained in its memory 17 to the signal processor 8.

The central system 3, or any other apparatus, then determines which functions $h'_i(-t)_{rx}$ serve to optimize the unit of corrected signal $S_i(t)$, or the sum of corrected signals $S_i(t)$.

Thereafter, the central system 3 causes the computer 16 corresponding to each antenna 2 to store the link between a particular mobile 5 and the approximations $h'_i(-t)_{tx}$ and $h'_i(-t)_{rx}$ to be used with that mobile, the functions in question corresponding to the area 18 or 19 in which the mobile is to be found.

Each time the base 1 transmits a radio message to the mobile in question, or receives a message from the mobile, the computer 16 applies the functions $h'_i(-t)_{rx}$ and $h'_i(-t)_{tx}$ for use with that mobile to the signal processors 8 and 11.

In a third embodiment, to determine the approximations $h'_i(t)_{tx}$ and $h'_i(t)_{rx}$ of the impulse response between the mobile 5 under consideration and the antenna i, the mobile is no longer caused to transmit a run of monochromatic radio signals, but is caused to transmit in succession a signal modulated around each of the frequencies f0 and f1, said signal being modulated in frequency or in phase in a predetermined manner.

The modulated radio signals which are transmitted by the mobile 5 to enable the base 1 to determine the approximations $h'_i(t)_{tx}$ and $h'_i(t)_{rx}$ respectively can be expressed in the form:

$$E0(t) = e^{j2\pi f0 t} \cdot e^{js(t)}$$

and $$E1(t) = e^{j2\pi f1 t} \cdot e^{js(t)}$$

where s(t) corresponds to the predetermined modulation.

There exist two functions F0(t) and F1(t) which correspond respectively to the functions E0(t) and E1(t) and which are defined by:

$$F0(t) \otimes E0(t) = \gamma 0(t)$$

and $$F1(t) \otimes E1(t) = \gamma 1(t)$$

where $\gamma 0(t)$ and $\gamma 1(t)$ represent functions of time having a spectrum that is constant in amplitude and phase in frequency bands centered respectively on f0 and f1, said frequency bands being of widths which correspond respectively to the modulation widths around the frequencies f0 and f1 used in the radio link in question.

To determine the approximations $h'_i(t)_{tx}$ and $h'_i(t)_{rx}$, the following convolution products are performed respectively: F0(t) by the signal $R_i(t)$ received by antenna i while the mobile 5 is transmitting the signal E0(t); and F1(t) by the signal $R_i(t)$ received by the antenna i when the mobile 5 is transmitting the signal E1(t).

To this end, as shown in FIG. 4, the circuits 12, 13, 14, and 15 shown in FIG. 2 in each signal processing unit 4 are replaced by two circuits 20 and 21 which are adapted to perform the convolution product of the signal $R_i(t)$ with F0(t) and with F1(t) respectively, so as to apply the respective approximations $h'_i(t)_{tx}$ and $h'_i(t)_{rx}$ directly to the computer 16.

The computer 16 then determines the time-reversed functions $h'_i(-t)_{tx}$ and $h'_i(-t)_{rx}$, and it stores them in its memory 17 for each mobile 5 as explained above.

Naturally, the third embodiment as described above can also be used to determine the various approximations $h'_{ik}(t)_{tx}$ and $h'_{ik}(t)_{rx}$ when it is desired to determine all of the approximations $h'_i(t)_{tx}$ and $h'_i(t)_{rx}$ for a given geographical area once and for all as explained above with reference to FIG. 3.

In a fourth embodiment, when the modulated signals transmitted by the mobile 5 or by the base 1 are at frequencies very close to the frequencies f0 and f1, i.e. when the frequency variation Δf around these two carrier frequencies is less than f0/100 and f1/100, respectively, then it is possible to make the approximation that the signals interchanged between each antenna i of the base 1 and the mobile 5 are substantially monochromatic.

In this case, a signal $S_i(t)$ for transmitting by the antenna i is written, in complex notation, in the form:

$$S_i(t) = Be^{j2\pi f0 t}$$

The corrected signal $S_i(t)$ is then written:

$$\begin{aligned} S'_i(t) &= S_i(t) \otimes h'_i(-t) \\ &= \int_{-\infty}^{+\infty} S_i(t-\tau) h'_i(-\tau) d\tau \\ &= \int_{-\infty}^{+\infty} B e^{j2\pi f0(t-\tau)} h'_i(-\tau) d\tau \\ &= B e^{j2\pi f0 t} \int_{-\infty}^{+\infty} e^{-j2\pi f0\tau} h'_i(-\tau) d\tau \end{aligned}$$

Which can be rewritten, using the variable $\theta = -\tau$ $$\begin{aligned} S'_i(t) &= B e^{j2\pi f0 t} \int_{-\infty}^{+\infty} e^{-j2\pi(-f0)\theta} h'_i(\theta) d\theta \\ &= -S_i(t) \cdot H_i(-f0) \end{aligned}$$

where $H_i(-f0)$ is the transfer function corresponding to the antenna i and to the mobile 5 for the frequency (−f0) which, as is well known, is also the conjugate of the value of the transfer function corresponding to the frequency (+f0):

if $H_i(f0) = A_i e^{j\phi i}$ then:

$$H_i(-f0) = A_i e^{-j\phi i}$$

Consequently, the corrected signal $S'_i(t)$ is computed by multiplying the signal $S_i(t)$ by the complex number $-H_i(-f0)$:

$$S'_i(t) = S_i(t) \cdot [-H_i(-f0)]$$

Similarly, when the signal $S_i(t)$ is a signal received from the mobile 5, the corrected signal $S'_i(t)$ is computed by multiplying the signal $S_i(t)$ by the complex number $-H_i(-f1)$:

$$S'_i(t) = S_i(t) \cdot [-H_i(-f1)]$$

In this fourth embodiment, each signal processing unit 4 can be similar to that shown in FIG. 2.

The amplitude and the phase of each complex number $H_i(f0)$ and $H_i(f1)$ are determined by causing the mobile 5 under consideration periodically to transmit monochromatic signals of respective frequencies f0 and f1, in which case each antenna i receives the following signals respectively:

$$R_i(t) H_i(f0) \cdot E_0 e^{j2\pi f0 t}$$

and $$R_i(t) H_i(f1) \cdot E_0 e^{j2\pi f1 t}$$

Since the base 1 and the mobile 5 share a common time-base, said base 1 is capable of determining the modulus and the argument of each of the complex numbers $H_i(f0)$ and $H_i(f1)$ from the above-mentioned received signals, using the circuits 12 and 13.

The values measured in this way are forwarded to the computer 16 which determines the values $-H_i(f0)$ and $-H_i(f1)$ and stores them in the memory 17.

As already explained above, when the base 1 subsequently communicates with a mobile 5 under consideration, the computer 16 informs the circuit 8 of the modulus and the argument of $-H_i(-f1)$, and the circuit 11 of the modulus and the argument of $-H_i(-f0)$, said circuits being adapted respectively to multiply the signals received by the antenna i by $-H_i(-f1)$ and to multiply the signals that are to be transmitted by the antenna i by $-H_i(-f0)$.

The fourth embodiment as described above can naturally also be used when the correction to be applied to the electric signals $S_i(t)$ is a correction that is predetermined once and for all for a mobile 5 in a given geographical area in which case the signals $S_i(t)$ are likewise corrected by multiplying the transmit signal and the receive signal by the respective complex numbers $-H_i(-f0)$ and $-H_i(-f1)$, with the complex numbers $H_i(f0)$ and $H_i(f1)$ being defined as follows:

$$H_i(f0) = \Sigma_k a_k H_{ik}(f0)$$

and $$H_i(f1) = \Sigma_k a_k H_{ik}(f1)$$

where $H_{ik}$ is the transfer function between the antenna i and a point k in the area under consideration, the values $H_{ik}(f0)$ and $H_{ik}(f1)$ being determined as explained above, and the terms $a_k$ being weighting coefficients similar to those already explained for the second embodiment.

In a fifth embodiment, when the signals $S_i(t)$ that are to be transmitted by each antenna i are modulated signals, preferably in a relatively narrow frequency band about the transmit carrier frequency f0, the signals $S_i(t)$ can be processed in simplified manner.

By writing:

$$S_i(t) = B e^{j2\pi f0 t} \cdot e^{js(t)}$$

where s(t) is the modulating signal, then the corrected signal $S'_i(t)$ that needs to be transmitted by the antenna i can be written in the form:

$$\begin{aligned} S'_i(t) &= S_i(t) \otimes h_i(-t)_{tx} \\ &= \int_{-\infty}^{+\infty} B e^{j2\pi f0(t-\tau)} \cdot e^{js(t-\tau)} h_i(-\tau)_{tx} d\tau \\ &= B e^{j2\pi f0 t} \int_{-\infty}^{+\infty} e^{-j2\pi f0\tau} \cdot e^{js(t-\tau)} h_i(-\tau)_{tx} d\tau \end{aligned}$$

-continued $$= Be^{j2\pi f0t} \cdot [-H_i(-f0)] \cdot$$
$$\int_{-\infty}^{+\infty} [-H_i(-f0)]^{-1} e^{-j2\pi f0\tau} e^{js(t-\tau)} h_i(-\tau)_{tx} d\tau$$

where:

P(t) is the carrier of frequency f0;

$H_i(-f0)$ is the conjugate of the complex value of the transfer function $H_i$ for the frequency f0: $H_i(-f0)=A_i e^{-j\Phi i}$ if $H_i(f0)=A_i e^{j\Phi i}$; and $C_i(t)$ is a correction term which is a relatively slow function of time t, such that said function can be computed numerically.

In this embodiment, each signal processing unit 4 can be as shown in FIG. 5, for example.

This signal processing unit 4 differs from that shown in FIG. 2 by the fact that it includes not only the circuits 12, 13, 14, and 15 for measuring the amplitude and the phase of a signal received by the antenna 2, but that it also includes the circuits 20 and 21 already shown in FIG. 4, and serving to determine the approximations $h'_i(t)_{tx}$ and $h'_i(t)_{rx}$ directly.

In this embodiment, each mobile 5 which is in communication with the base 1 periodically transmits initially a monochromatic signal of frequency f0 only, thereby enabling the computer 16 to determine the amplitude and the phase of $-H_i(f0)$, as explained above for the fourth embodiment, and then the mobile 5 transmits in succession a signal modulated around the frequency f0 and a signal modulated around the frequency f1, thereby enabling the computer 16 to know the approximations $h'_i(t)_{tx}$ and $h'_i(t)_{rx}$, and thus $h'_i(-t)_{tx}$ and $h'_i(-t)_{rx}$.

The various data items $-H_i(-f0)$, $-h'_i(-t)_{tx}$, and $h'_i(-t)_{rx}$ are then stored in the memory 17 for each mobile 5 in communication with the base 1.

When a particular mobile 5 communicates with the base 1 at a given instant, the computer 16 then informs the signal processor 8 of the data items corresponding to the approximation $h'_i(-t)_{rx}$, and the signal processor 11 of the data items corresponding to $-H_i(-f0)$ and to $h'_i(-t)_{tx}$.

The signal processor 8 operates as descried above with reference to FIGS. 2 and 4, while the signal processor 11 is a simplified processor comprising:

an analog first circuit 22 which receives from the computer 16 data corresponding to $-H_i(-f0)$ and which receives from the central system 3 the carrier P(t) of frequency f0, to determine the product $P(t)\cdot[-H_i(-f0)]$, which is applied to an output 22a;

a digital second circuit 23 which receives from the computer 16 data corresponding to $-H_i(-f0)$ and to the approximation $h'_i(-t)_{tx}$, and which receives from the central system 3 the modulating signal s(t) which carries the information that is to be sent to the mobile 5 under consideration, said second circuit 23 being adapted to compute the above-mentioned correction function $C_i(t)$ and to apply it to an output 23a; and a third circuit 24 which is connected to the outputs of the first two circuits 22 and 23 to produce the product of the signals output by said circuits, which product corresponds to the corrected signal $S'_i(t)$.

We claim:

1. A method of optimizing radio communication between a fixed base transmitter/receiver station provided with a plurality of synchronized antennas organized in an array, and at least one mobile transmitter/receiver station, the method consisting, for each antenna i in the base, processing an electric signal $S_i(t)$ which is a receive signal received by said antenna from the mobile under consideration or which is a transmit signal for transmission by said antenna to said mobile, by determining a corrected electric signal $$S'_i(t)=h'_i(-t)\otimes S_i(t)$$

where:

$\otimes$ designates the convolution product;

t designates time; and $h'_i(-t)$ is an approximation to the time reversal of the impulse response $h_i(t)$ between the antenna i and the mobile, said impulse response being such that when a radio signal E(t) is transmitted by one of the antenna and the mobile, the other of said two elements receives a signal $R(t)=h_i(t)\otimes E(t)$;

the corrected signal $S'_i(t)$ then being either transmitted to the mobile by the antenna in question if the signal $S_i(t)$ is a transmit signal, or else being combined with the other signals as received by the other antennas of the base, if the signal $S_i(t)$ is a receive signal.

2. A method according to claim 1, including the following steps:

a) determining for each antenna i an approximation $h'_i(t)$ to the impulse response $h_i(t)$;

b) time reversing said approximation $h'_i(t)$, thus providing an approximation $h'_i(-t)$ to the time reversed impulse $h_i(-t)$; and c) for each antenna i, processing the electric signal $S_i(t)$ so as to determine the corresponding corrected signal $S'_i(t)$.

3. A method according to claim 2, in which, during step a), the approximation $h'_i(t)$ of the impulse response specific to each antenna is determined on the basis of a predetermined radio signal transmitted by the mobile, said step a) being performed at regular time intervals for each mobile.

4. A method according to claim 2, in which steps a) and b) are performed once and for all, for a given geographical area, step a) consisting in transmitting at least one predetermined radio signal successively from a plurality of points k in the area under consideration, thereby determining a series of approximations $h'_{ik}(t)$ of the impulse response $h_{ik}(t)$ between each point k and each antenna i of the base, and then in computing the approximation $h'_i(t)$ using the formula $h'_i(t)=\Sigma_k a_k h'_{ik}(t)$, where the terms $a_k$ designate weighting coefficients, said approximation $h'_i(t)$ subsequently being used in step c) for processing the signals transmitted to or received from any mobile located in the above-mentioned given area.

5. A method according to claim 4, in which the base covers a plurality of above-mentioned areas, a series of approximations $h'_i(t)$ to the impulse response being determined once and for all in steps a) and b) for each of the above-mentioned areas, and in which step c) is implemented successively at least at the beginning of each call between a base and each mobile, respectively with each of the series of approximations $h'_i(t)$ corresponding respectively to the various areas, determining on each occasion a corrected signal $S'_i(t)$ from a signal $S_i(t)$ received from the mobile under consideration, and then determining which series of approximations $h'_i(t)$ corresponding to a given area optimizes the combination of corrected signals $S'_i(t)$, said series of approximations $h'_i(t)$ subsequently being used to correct the signals transmitted to or received from the mobile under consideration.

6. A method according to claim 3, in which the radio signals normally transmitted by the base are modulated signals having a carrier frequency f0, the signals normally transmitted by the mobile are modulated signals having a carrier frequency f1 that is different from f0, and the steps a) and b) are performed as follows:

firstly, by causing a first predetermined radio signal to be transmitted by the mobile or from each point k, said signal having frequencies close to f0, thereby enabling an approximation $h'_i(t)_{tx}$ to the impulse response to be determined that is valid for subsequent use in step c) for processing the signals that are to be transmitted by the antenna i; and secondly by causing a second predetermined radio signal to be transmitted by the mobile or from each point k, said signal having frequencies close to f1, thereby enabling an approximation $h'_i(t)_{rx}$ to the impulse response to be determined which is valid for subsequent use during step c) for processing the signals received by the antenna i.

7. A method according to claim 2, in which the radio signals normally transmitted by the base are modulated signals at a carrier frequency f0, the method including the following additional steps:

a'1) causing a monochromatic radio signal E(t,f0) of frequency f0 to be transmitted by the mobile or from each point k;

a'2) using each antenna i to pick up a monochromatic electric signal $R_i(t,f0)$ corresponding to the transmitted monochromatic signal E(t,f0); and a'3) using the picked up signal to determine a complex value $H_i(f0)=A_i e^{j\Phi i}$ defined by:

$$R_i(t,f0)=H_i(f0)\cdot E(t,f0);$$

step c) of the method further including the following three substeps, for determining the corrected signal $S'_i(t)$ from a transmit signal $S_i(t)=P(t)\cdot e^{js(t)}$, where P(t) is a carrier signal of frequency f0, and s(t) is a modulating signal:

c1) using analog means to determine the product $P'(t)=P(t)\cdot[-H_i(-f0)]$, where $H_i(-f0)=A_i e^{-j\Phi i}$;

c2) digitally computing the function $$C_i(t) = \int_{-\infty}^{+\infty} [-H_i(-f0)]^{-1} e^{-j2\pi f0\tau} e^{js(t-\tau)} h'_i(-\tau) d\tau$$

c3) determining the correct signal $S'_i(t)$ by obtaining the product of the complex functions P'(t) and $C_i(t)$.

8. A method according to claim 1, in which the signal to be corrected $S_i(t)$ is a modulated signal having a determined carrier frequency f, said signal being modulated over a range of frequencies of width that is less than 1% of the carrier frequency f, the method including the following steps:

d) determining $H_i(f)=A_i e^{j\Phi i}$ which is the complex value of the transfer function between the antenna i and the mobile at frequency f, said transfer function being such that when a monochromatic radio signal E(t,f) of frequency f is transmitted by one of the antenna and the mobile, the other of said two elements received a signal $R(t,f)=H_i(f).E(t,f)$; and e) determining the corrected signal $S'_i(t)$ in approximate manner from the following complex product:

$$S'_i(t)=[-H_i(-f)]\cdot S_i(t) \text{ where } H_i(-f)=A_i e^{-j\Phi i}$$

9. A method according to claim 8, in which, during step d), the value $H_i(f)$ is determined in the base from a monochromatic radio signal of frequency f transmitted by the mobile, said determination being performed at regular time intervals for each mobile.

10. A method according to claim 8, in which, during step d), the transfer function $H_i(f)$ is determined for a given area once and for all, by causing a monochromatic radio signal of frequency f to be transmitted successively from a plurality of points k in the area under consideration, thereby determining a series of values $H_{ik}(f)$ for the transfer functions $H_{ik}$ between each point k and each antenna i of the base, and then calculating the value $H_i(f)$ in application of the formula:

$$H_i(f)=\Sigma_k a_i H_{ik}(f)$$

where the terms $a_k$ designate weighting coefficients, said value $H_i(f)$ then being used to process the signals transmitted to or received from any mobile in the above-mentioned given area.

11. A method according to claim 10, in which the base covers a plurality of the above-mentioned areas, a series of values $H_i(f)$ for the transfer function being determined in step d) for each of the above-mentioned areas, and in which step e) is implemented at least at the beginning of each call between the base and each mobile, with each series of approximations $H_i(f)$ corresponding to respective different areas, by determining on each occasion a corrected signal $S'_i(t)$ from a signal $S_i(t)$ received from the mobile under consideration, and then determining which series of values $H_i(f)$ corresponding to a given area optimizes the combination of corrected signals $S'_i(t)$, said series of values $H_i(f)$ subsequently being used in step e) to correct the signals transmitted to or the signals received from the mobile under consideration.

12. A method according to claim 8, in which the radio signals normally transmitted by the base are modulated signals having a carrier frequency f0, the signals normally transmitted by a mobile being modulated signals having a carrier frequency f1 different from f0, and step d) is performed as follows:

firstly by causing a monochromatic radio signal of frequency f0 to be transmitted by the mobile or from each point k, thereby enabling a value $H_i(f0)$ to be determined for the impulse response which is valid subsequently during step e) for processing the signals to be transmitted by the antenna i; and secondly causing a monochromatic radio signal of frequency f1 to be transmitted by the mobile or from each point k in order to determine a value $H_i(f1)$ for the transfer function which is valid subsequently during step e) for processing the signals received by the antenna i.

* * * * *